(12) United States Patent
Hoshizawa

(10) Patent No.: US 8,174,942 B2
(45) Date of Patent: May 8, 2012

(54) DATA RECORDING METHOD CAPABLE OF REPLACING DEFECTIVE DATA ON DIFFERENT LOCATION IN SPARE AREAS

(75) Inventor: Taku Hoshizawa, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 2272 days.

(21) Appl. No.: 10/968,359

(22) Filed: Oct. 20, 2004

(65) Prior Publication Data

US 2005/0175323 A1    Aug. 11, 2005

(30) Foreign Application Priority Data

Feb. 5, 2004    (JP) .................................. 2004-028795

(51) Int. Cl.
   *G11B 5/09* (2006.01)
(52) U.S. Cl. ................ 369/47.14; 369/53.17; 369/53.15
(58) Field of Classification Search .............. 369/47.14, 369/53.17, 53.15, 275.3, 53.16, 53.2, 53.41; 714/710, 711; 711/4, 100
   See application file for complete search history.

(56) References Cited

U.S. PATENT DOCUMENTS

| | | | | |
|---|---|---|---|---|
| 6,477,126 B1 * | 11/2002 | Park et al. | ................... | 369/53.15 |
| 6,480,446 B1 * | 11/2002 | Ko | .................... | 369/47.14 |
| 6,581,167 B1 * | 6/2003 | Gotoh et al. | ....................... | 714/7 |
| 7,002,882 B2 * | 2/2006 | Takahashi | ................... | 369/47.14 |
| 7,360,126 B2 * | 4/2008 | Hwang et al. | ................... | 714/710 |
| 2003/0196133 A1 * | 10/2003 | Park et al. | ........................... | 714/7 |
| 2004/0076096 A1 * | 4/2004 | Hwang et al. | ............... | 369/53.21 |
| 2004/0179445 A1 * | 9/2004 | Park et al. | ................... | 369/47.14 |
| 2004/0246852 A1 * | 12/2004 | Hwang et al. | ............... | 369/47.14 |

FOREIGN PATENT DOCUMENTS

| | | |
|---|---|---|
| JP | 02-183472 | 7/1990 |
| JP | 03-222154 | 10/1991 |
| JP | 63-124270 | 5/1998 |
| JP | 11-086418 | 3/1999 |
| JP | 2003-249030 | 9/2003 |

* cited by examiner

*Primary Examiner* — Tan X Dinh
(74) *Attorney, Agent, or Firm* — McDermott Will & Emery LLP

(57) ABSTRACT

Disclosed data recording techniques prevent extremely decreasing writing/reading speed due to consecutive defects, which often occur when using a disk of large storage capacity, while allowing the size of a spare area used for alternate processing of a recordable optical disk to be changed. The disclosed data recording method comprises receiving from a higher-level device a write command to write data at a first address in a user area; writing the data at the first address; and reading the written data to thereby judge whether or not the first address is defective. If the first address is defective, a second address in a spare area is determined by use of a flag value that has been written to a lead-in area or a lead-out area at the time of initialization; and the data is written at the second address received from the higher-level device.

24 Claims, 12 Drawing Sheets

DATA RECORDING METHOD CAPABLE OF REPLACING DEFECTIVE DATA ON DIFFERENT LOCATION IN SPARE AREAS

RELATED APPLICATION

This application claims the benefit of Japanese Application No. 2004-028795 Filed Feb. 5, 2004, the disclosure of which is entirely incorporated herein by reference.

TECHNICAL FIELD

The present teachings relate to recording techniques for recording digital data on a recording medium.

BACKGROUND

Examples of devices for writing/reading digital data to/from a recording medium include a read/write device for a DVD-RAM, which is specified in the International Standard ECMA-272, and the like.

When a disk is inserted or the power is turned on, the read/write device first verifies written contents in a defect management information area (DMA), and the like, which are allocated in lead-in and lead-out areas, to check whether or not the DVD-RAM has been physically formatted. If the DVD-RAM has not been physically formatted, the read/write device waits until an instruction to physically format the DVD-RAM is received from a higher-level device or a user.

If the DVD-RAM has been physically formatted, the read/write device performs write preparation processing including calibration processing and logical consistency verification, and then enters a state of waiting for an instruction from the user or the higher-level device. On the receipt of some "command", the read/write device identifies its kind. If the received command is a write command, the read/write device performs write processing of writing user data. If the received command is a read command, a format command, a disk eject command, or the like, the read/write device performs the corresponding processing thereof. Usually, the above processing successfully ends.

However, there is a very rare a case where the processing cannot be completed as usual for reasons that cannot be expected. For example, if the read/write device fails in writing user data because a user area of the optical disk includes a defect, the read/write device performs error processing such as retry processing and alternate processing. Usually, the read/write device used for a DVD-RAM, performs write processing of user data, the user data is actually read to check whether or not the user data has been successfully written, and the alternate processing that allocates user data to a spare area instead of a user area is performed if necessary, thereby increasing the reliability of the optical disk. Information about the correspondence between an address of the user area and that of the spare area, which shows the result of this alternate processing, is standardized in the ECMA-272 so that the information is written to DMA as DL.

In addition, as a management method for managing a recorded area on a recording medium, Japanese Patent Application Laid-Open No. Hei 11-86418 describes the recording device that manages a recordable area on a block basis (a block is a unit of read or write) using a bit map indicating whether or not each block has already been written.

SUMMARY

A spare area of an optical disk such as a DVD-RAM, particularly, a spare area allocated in proximity to a lead-out area, is consecutively used in the direction from the lead-out side to the lead-in side. Such use of the spare area allows the size of the spare area to be changed depending on the number of defects occurring while using the optical disk.

FIG. 5 is a schematic diagram of a disk illustrating the defect management that is generally performed for a recordable optical disk. FIG. 5 shows that the disk is logically divided into areas according to purposes. To put it simply, the optical disk is divided into a lead-in area, a data area, and a lead-out area; and the data area is further divided into a user area and a spare area according to purposes. The following are written to a defect management information area (DMA) in the lead-in area: DDS that mainly includes information about a logical structure of the optical disk, such as a start address of each logically divided area; and a DL table constituted of a plurality of DLs, each of which shows a user area, and the correspondence between an address of the user area and that of a spare area. In addition, the spare area is consecutively used in the direction from the lead-out area to the lead-in area by use of a pointer P pointing to an address of an alternate area that is to be used next.

FIG. 6 is a diagram simply illustrating DLs constituting a DL table. Each DL includes: a defect address of the user area; a replacement address of the spare area, which is assigned by alternate processing; and a status of the DL. In the figure, an area which is colored black indicates a used area of the spare area. The pointer P points to M. If it is judged that an address N in the user area is defective for use in the optical disk, user data to be written at the address N is written at an address M in the spare area. In order to indicate this information, the DL includes "replacement", "address N", and "address M". The DL is then stored in the DL table.

This description is based on the assumptions that the DL table is configured by putting one DL upon another, and that every time the alternate processing is performed, a DL is added. In addition, a DL for an address in an unused spare area is not included in the DL table as a replacement address.

Accordingly, as for the pointer P described above, it is found out that the smallest replacement address in the DLs in the DL table is determined, and a value obtained by subtracting 1 from the smallest replacement address agrees with the address P. In other words, it is also possible to determine the address P from the DL table without directly managing the address P.

FIG. 7 is a diagram illustrating DLs applied when the alternate processing continuously occurs. If it is judged that a recording area at an address N in the user area is defective in a state in which the pointer P points to M, user data to be written at the address N is written at the address M in the spare area, and the pointer P pointing to the next alternate area is then moved to an address M−1. Subsequently, if it is judged that a recording area at an address N+1 in the user area is defective, an address M−1 is assigned as an alternate area thereof, and the pointer P is moved to an address M−2. Further, if it is judged that a recording area at an address N+2 in the user area is defective, an address M−2 is assigned as an alternate area thereof, and the pointer P is moved to an address M−3. However, if a recording area at the address M−2 in the spare area is also judged to be defective, user data to be written at the address N+2 is written to the next address M−3 again, and the pointer P is then moved to an address M−4. DLs obtained as a result of the above processing are as shown in the table. Because the address M−2 is defective, a status of this DL becomes "Defect".

Accordingly, for the conventional defect management, a data arrangement obtained as a result of the alternate processing, which assigns addresses of defects consecutively occurring to the spare area, differs from a data arrangement that is actually written/read. In addition, with the increase in data recording density on an optical disk, defects tend to consecutively occur. However, in the conventional method of using a spare area, if defects consecutively occur, data is placed in reverse order, which also causes a problem of requiring much time to write/read data to/from the spare area.

The bit map described in Japanese Patent Application Laid-Open No. Hei 11-86418 is targeted for the whole rewriting area constituted of a lead-in area, a user area, and a lead-out area on a disk. The bit map, therefore, is not targeted for part of the rewriting area such as a spare area. There is no specific description of how to use the bit map, and effects of the bit map, from this viewpoint.

An object is to establish an environment in which, without losing the conventional advantages, a spare area can be made use of by the most appropriate method in response to a situation in which an optical disk is being used. The object can be achieved by (1) and (2) described below.

(1) A data recording method or device for recording data on a recording medium including a lead-in area, a user area, a spare area having an alternate area of the user area, and a lead-out area, where the method or device comprises or performs the steps of: receiving from a higher-level device a write command to write data at a first address in the user area; writing the data at the first address; reading the written data to thereby judge whether or not the first address is defective; if it is judged that the first address is defective, determining a second address in the spare area by use of a flag value that has been written to the lead-in area or the lead-out area at the time of initialization; and writing at the second address the data received from the higher-level device.

(2) A data recording method or device for recording data on a write once read many recording medium including a lead-in area, a user area, a spare area having an alternate area of the user area, and a lead-out area, where the method or device comprises or performs the steps of: receiving from a higher-level device a write command to write data at a first address in the user area; judging, from management information of the lead-in area, whether or not writing has already been performed at the first address; if it is judged that writing has already been performed at the first address, determining a second address in the spare area by use of a flag value that has been written to the lead-in area or the lead-out area at the time of initialization; and writing at the second address the data received from the higher-level device.

In this way, a spare-area management method which is suitable for consecutive defects caused by the higher data density can be provided without losing the conventional advantages. This ensures the same reliability as before, and makes it possible to provide a recording medium capable of writing/reading at high-speed.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

DETAILED DESCRIPTION

Figure 1:
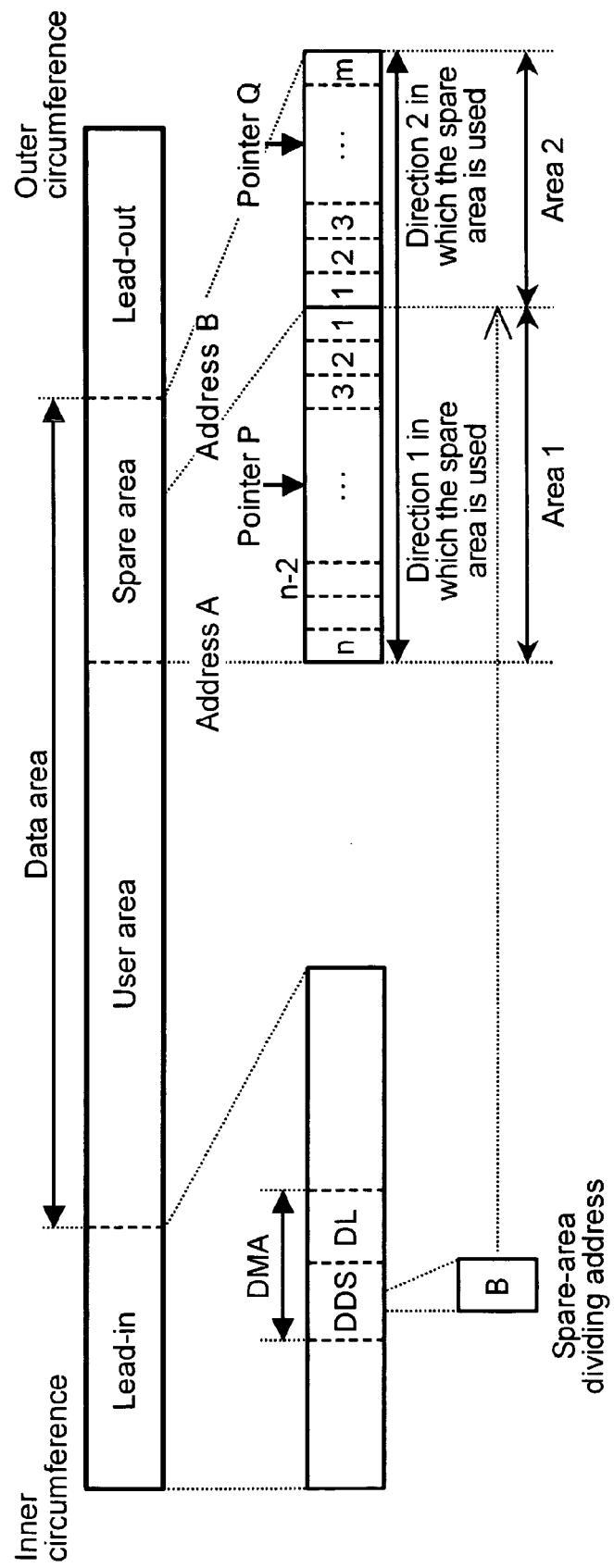
FIG. 1 is an explanatory diagram illustrating an optical disk having a spare area that is logically divided into a plurality of areas.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid d unnecessarily obscuring aspects of the present teachings.

According to the present teachings, a spare area in which an alternate area used for defect management is located is handled in the following ways: (1) using a flag so that how to use can be switched; and (2) logically dividing the spare area into a plurality of areas so that how to use differs on an area basis. Embodiments will be specifically described with reference to drawings as below. Reference numerals used in diagrams will be listed as follows:

401 Optical disk
402 Optical head
403 Read/write signal processing circuit
404 Control microcomputer
405 Servo circuit
406 Interface circuit
407 Input/output terminal To begin with, a data format, and a basic structure of a read/write device, which are used to describe the present invention, will be described with reference to FIGS. 2 through 4.

Figure 4:
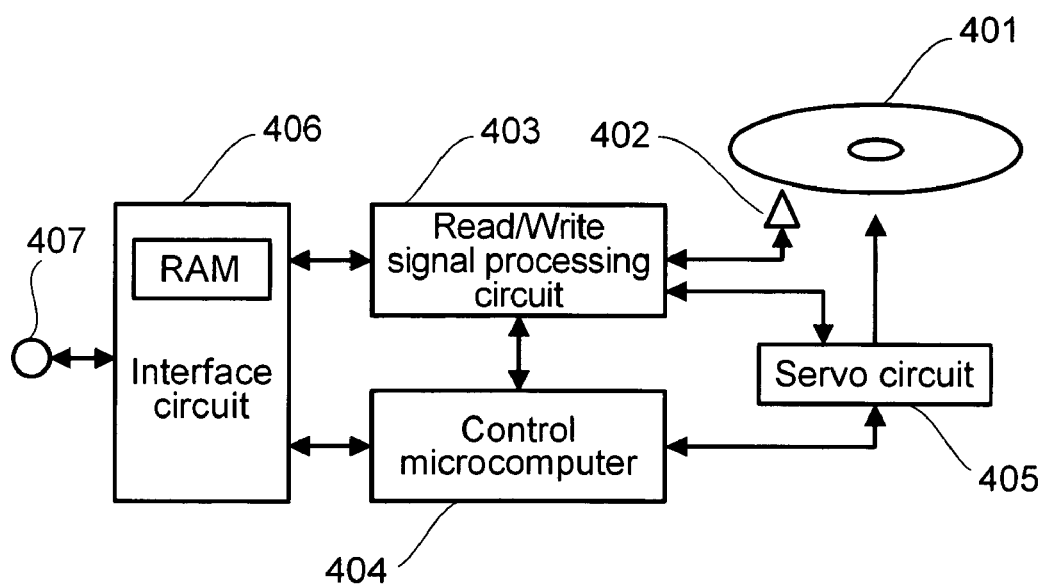
FIG. 4 is an explanatory diagram illustrating a configuration of an optical disk read/write device.

FIG. 4 is a diagram illustrating a configuration of an optical disk read/write device. In this drawing, reference numeral 401 denotes an optical disk; reference numeral 402 denotes an optical head including a laser diode and an optical detector; reference numeral 403 denotes a read/write signal processing circuit for performing encode processing for writing, and for performing decode processing for reading; reference numeral 404 denotes a control microcomputer used for operation management of each block; reference numeral 405 denotes a servo circuit; reference numeral 406 denotes an interface circuit for interfacing with higher-level devices including a RAM; and reference numeral 407 denotes an input/output terminal.

During reading, data written to the optical disk 401 is read out from the optical head 402, and then the read data is decoded in the read/write signal processing circuit 403. This decode processing includes demodulation processing, error correction processing, and descramble processing. Main data obtained after performing the decode processing is stored in a RAM in the interface circuit 406, and is then output to an external higher-level device (not illustrated), or the like, through the input/output terminal 407. On the receipt of an instruction from the higher-level device, or the like, the control microcomputer 404 gets access to a specified data location of the optical disk 401 while performing the rotation control of the optical disk 401 and the focus control, and the tracking control, of the optical head 403, by use of the servo circuit 405, so that reading of the device is totally controlled.

During writing, main data is inputted from the external higher-level device, or the like, through the input/output terminal 407. The inputted main data is stored in the RAM in the interface circuit 406. Then, the read/write signal processing circuit 403 performs the encode processing of the main data, such as scramble processing (e.g. encryption or the like), error correction coding processing, and modulation processing, before the main data is written to the optical disk 401 through the optical head 402. On the receipt of an instruction from the higher-level device, or the like, the control microcomputer 404 gets access to a specified write location of the optical disk 401 by use of the servo circuit 405 so that the writing control of the device is totally achieved.

The data encode processing to be performed during writing will be described in detail with reference to FIGS. 2 and 3.

Figure 2:
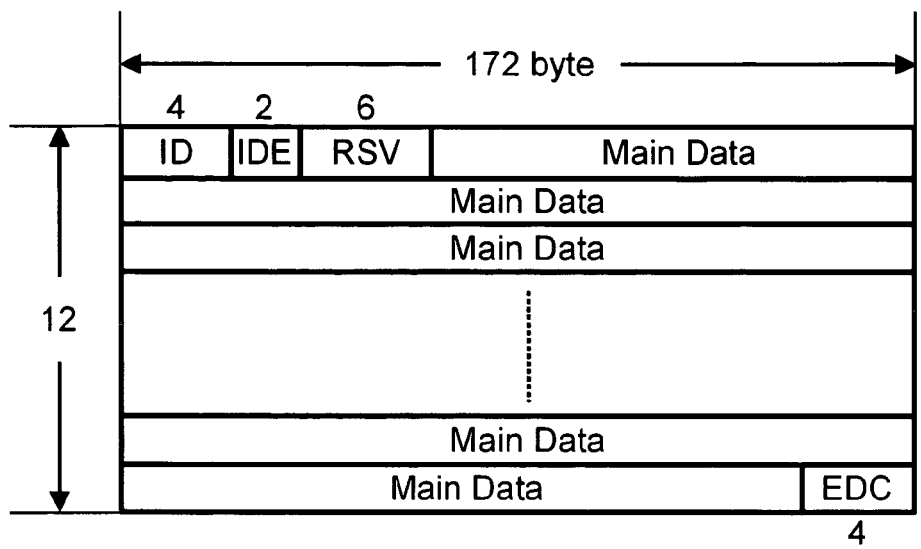
FIG. 2 is an explanatory diagram illustrating a configuration of a data frame.

FIG. 2 is a diagram illustrating how to configure a data frame. What are added to each main data having a length of 2048 bytes, which is inputted from the input/output terminal 407, are the following: a data identification code (ID) having a length of 4 bytes, which is used to identify data; IDE having a length of 2 bytes, which is an error detecting code of the ID; and RSV having a length of 6 bytes, which is a reserved data area. The error detecting code EDC having a length of 4 bytes, which is used to detect an error included in the data, is added to the end of this data string, constituting a data frame having a length of 2064 in its entirety. Each data unit is handled in the form of 172 bytes×12 rows.

Figure 3:
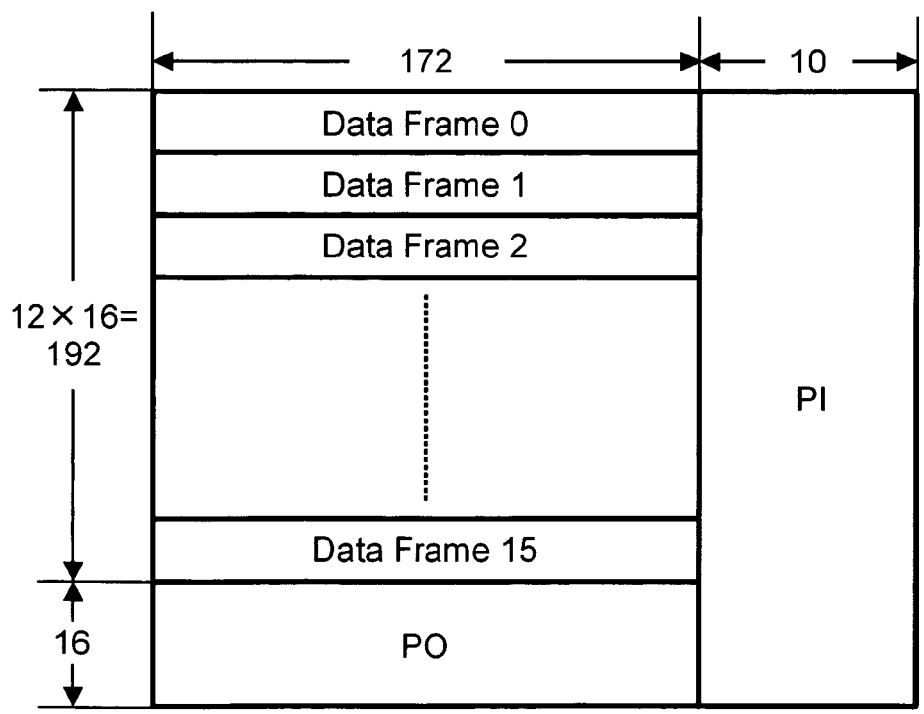
FIG. 3 is an explanatory diagram illustrating a configuration of an ECC block.

FIG. 3 is a diagram illustrating how to configure an ECC block. This description is based on the assumption that this ECC block is a unit of writing or reading. The scramble processing is performed for each data frame of 172 bytes×12 rows that is formed as shown in FIG. 2. After that, every 16 data frames form an ECC block. An outside code (PO) having a length of 16 bytes is added to each column in the longitudinal direction. To be more specific, in the ECC block, the outside code having 16 rows is added to data constituted of 192 rows (12 rows×16 data frames), and consequently the data has 208 rows. An inside code (PI) having a length of 10 bytes is added to data of each row so that the data has a length of 182 bytes.

During encode processing, after generating data of 182 bytes×208 rows in this manner, what is performed last in the read/write signal processing circuit 403 is frequency modulation, which limits a frequency component included in the data.

Accordingly, as for read/write devices that perform alternate processing, when writing user data, whether or not the data has successfully been written is checked after writing the data by immediately reading the data on the disk to compare this read data with main data stored in the RAM, or by using error correction processing to detect the number of errors included in the read data. As a result, if it is judged that the data has not successfully been written, writing at the same location is repeated. If successful writing at this location eventually fails, in other words, if it is judged that this location is defective, the alternate processing is performed: that is to say, user data stored in the RAM included in the interface circuit 406 is written to a spare area.

In addition, if the optical disk 401 is a write once read many optical disk, when a write command is received from a higher-level device, by use of a read signal a judgment is made before writing as to whether or not writing has already been performed at an address included in the write command. If it is judged that writing has not been performed at this address, writing is performed. However, if it is judged that writing has already been performed at this address, the address is treated as a defect, and accordingly the alternate processing which writes to a spare area is performed.

Figure 5:
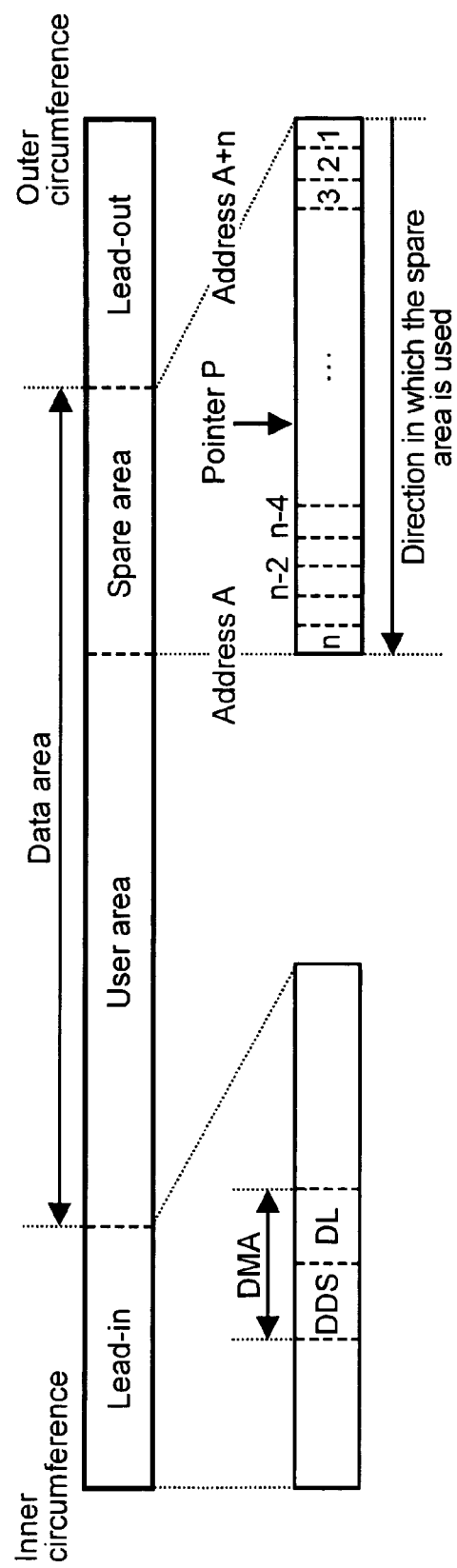
FIG. 5 is an explanatory diagram illustrating an optical disk having a defect management function.
Figure 6:
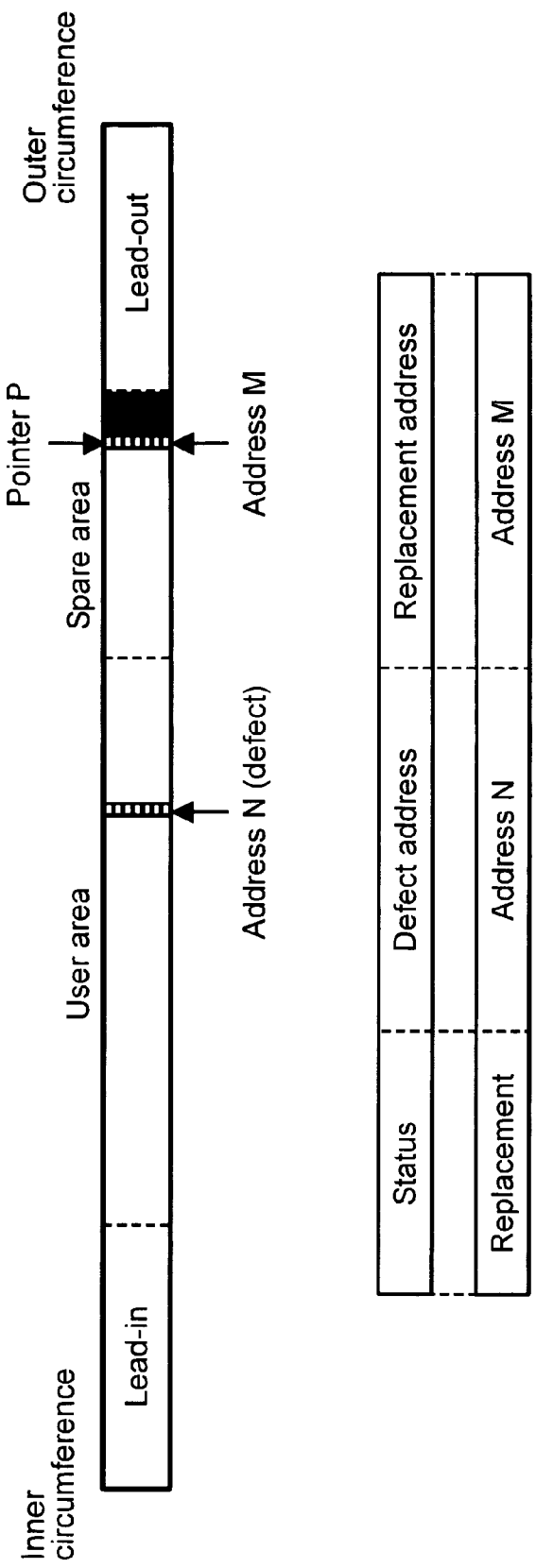
FIG. 6 is an explanatory diagram illustrating alternate processing and DL.

The alternate processing is performed for an ECC block that is a unit of write or read. Next, a specific example will be described with reference to FIGS. 5 through 7, which illustrate the defect management of DVD-RAM.

Figure 8:
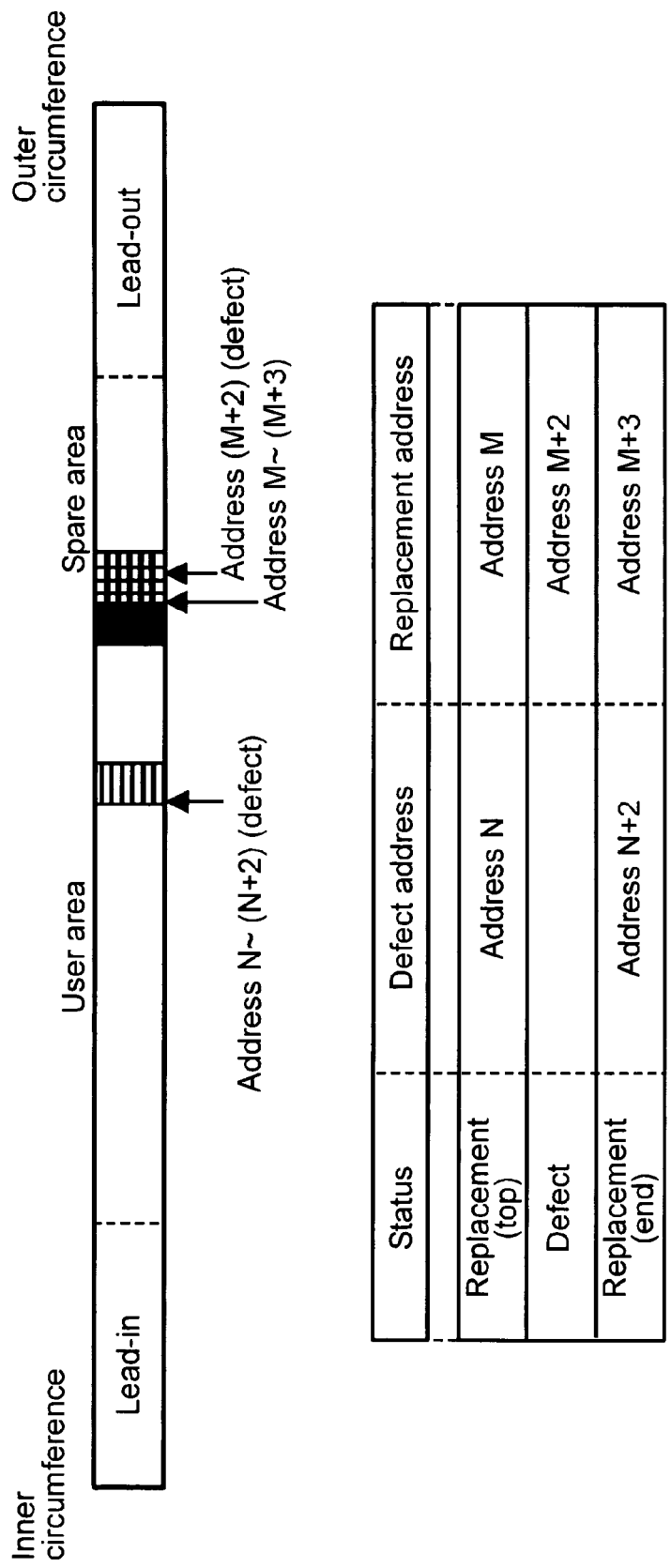
FIG. 8 is an explanatory diagram illustrating DL of consecutive defects.

FIG. 8 illustrates one scheme for solving the problems relating to the method of using a spare area, which is used in the conventional defect management.

This scheme is based on the assumption that an optical disk is divided into a lead-in area, a user area, a spare area, and a lead-out area. The following are written to a defect management information area (DMA) in the lead-in area: DDS that mainly includes information about a logical structure of the optical disk, such as a start address of each logically divided area; and a DL table constituted of a plurality of DLs, each of which shows a user area, and the correspondence between an address of the user area and that of a spare area. A spare area is consecutively used in the direction from the lead-in area to the lead-out area by use of a pointer P pointing to an address of an alternate area that is used next. There is shown a list of DL applied when the alternate processing continuously occurred in the substitution processing in which the method of using a spare area is changed in the above manner.

If it is judged that a recording area at an address N in the user area is defective in a state in which the pointer P points to M, user data to be written at the address N is written at the address M in the spare area, and the pointer P pointing to the next alternate area is then moved to an address M+1. Subsequently, if it is judged that a recording area at an address N+1 in the user area is defective, an address M+1 is assigned as an alternate area thereof, and the pointer P is moved to an address M+2. Further, if it is judged that a recording area at an address N+2 in the user area is defective, an address M+2 is assigned as an alternate area thereof, and the pointer P is moved to an address M+3. However, if a recording area at the address M+2 in the spare area is also judged to be defective, user data to be written at the address N+2 is written to the next address M+3 again, and the pointer P is then moved to an address M+4. Because the recording area at the address M+2 is defective, a status of this DL becomes "Defect." Here, three DLs are used in a manner that each DL is associated with each of the defect addresses N through N+2 as before. However, in the situation in which defects consecutively occur, associating the start and end of the defect addresses with the start and end of replacement addresses, and then introducing the status indicating "replacement (start)" and "replacement (end)," each of which differs from the conventional "replacement," make it possible to reduce the size of the DL list and to simplify the DL list.

As described above, in this defect management, a data row obtained as a result of the alternate processing, which assigns, to the spare area, addresses of defects consecutively occurring, can be regarded as the same as a data row to be written or read. Accordingly, it becomes possible to read/write data from/to the spare area by the same processing as that of user data and at the same speed as that of the user data.

Figure 9:
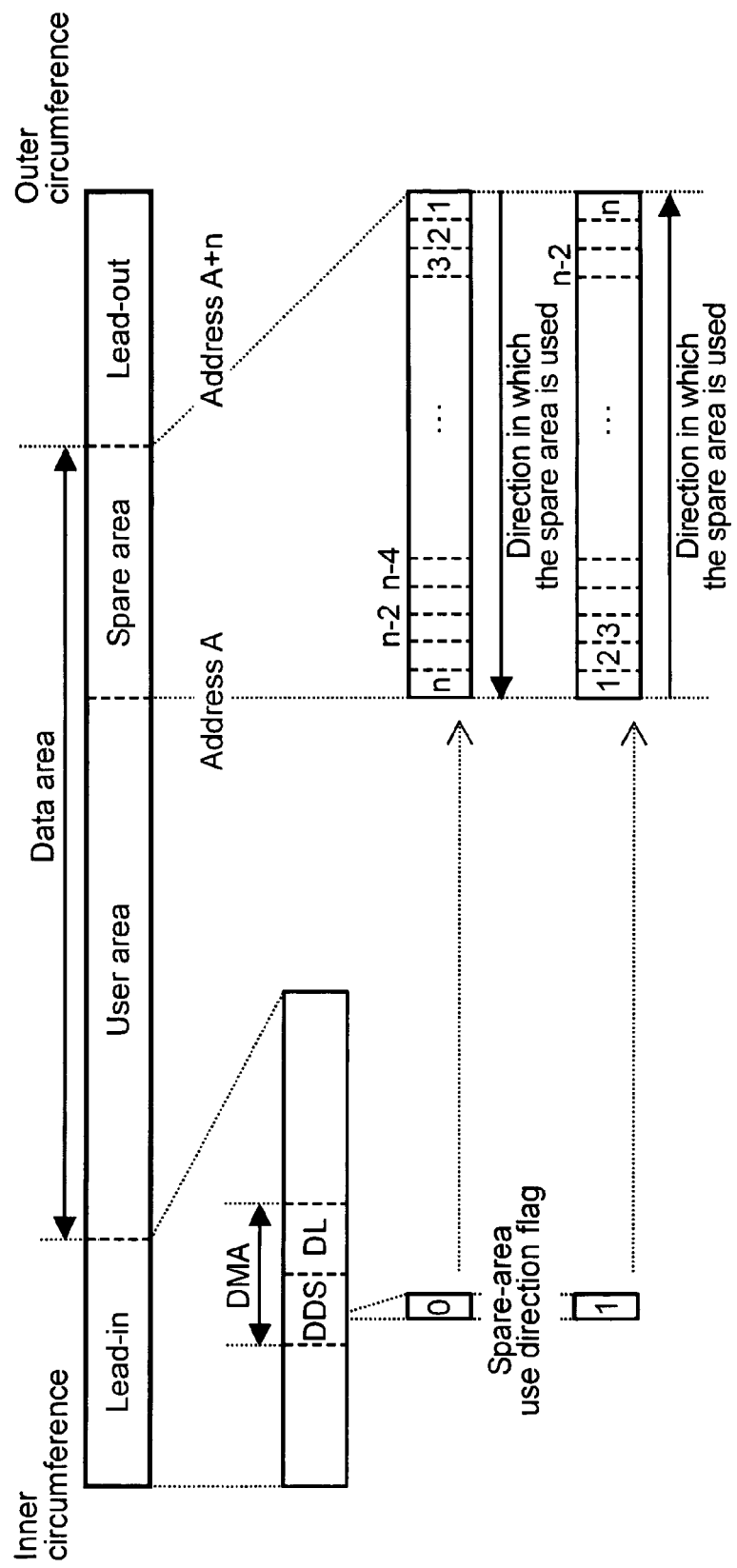
FIG. 9 is an explanatory diagram illustrating an optical disk having a spare area, a use method of which can be switched.

What will be described next with reference to FIGS. 1 and 9 is how to make use of both advantages of the conventional method of using a spare area and those of the method of using a spare area shown in FIG. 8 at the same time. FIG. 9 illustrates a method in which switching between both of the methods of using a spare area according to a purpose of using an optical disk, and a physical shape, and properties, of the optical disk makes it possible to make use of the advantages of both methods shown in FIGS. 7 and 8.

On a data recording part of an optical disk including a CD and a DVD, (physical) addresses are assigned from the inner circumference to the outer circumference. At the time of formatting (initialization processing), a data area of this optical disk is logically divided into a user area, a spare area, and the like, according to intended uses, and in a form suitable for the intended uses. Then, information about addresses and the size, which define these areas, is written to DDS in DMA included in lead-in and lead-out areas. The DDS includes not only address information defined for the purpose of this logical dividing, but also address information indicating an effective area in each area of various kinds of drive control areas, which are allocated in the lead-in and lead-out areas, and flag information indicating the disk status such as write protection. In addition, if a write once read many optical disk is used, DDS also includes flag information that selects a management method of managing a recorded area in user data, and recorded area information.

Moreover, in addition to the DL table indicating a state of each replacement address in the spare area, and DMA, data management information is written to a dedicated area at the same time.

DDS in this DMA is provided with a spare-area use direction flag so that it becomes possible to switch a direction in which the spare area is used. The spare-area use direction flag indicates a direction in which the spare area is used, to be more specific, a direction from the outer circumference to the inner circumference, or a direction from the inner circumference to the outer circumference. It is to be noted that this flag can also be used in combination with various kinds of information, including addresses and flags in the lead-in and lead-out areas, which are conventionally used.

An example of determining a value of this spare-area use direction flag involves a technique in which a spare-area use direction is switched according to an application used when logically formatting a disk. For example, when formatting an optical disk using an AV recorder, it can be judged that the optical disk is mainly used for video recording. In the case of the AV recorder, the rise time after inserting the disk should be faster than that of usual PC drives. Accordingly, it is desirable that file management information be consecutively written. In addition, because video of a video file should also be continuously reproduced without intermission, it is desirable that a direction in which a spare area is used be from the inner circumference of the disk to the outer circumference. However, if the same optical disk is used as a PC drive for data backup, such an environment is thought to be suitable, in which instead of increasing the speed of writing and reading, a user can freely set the size of a user data area in response to the file capacity.

Moreover, it is to be noted that attention is paid to a physical shape or structure. For example, if the optical disk is not covered with a cartridge, the optical disk is subject to a flaw. Accordingly, if the optical disk is covered with a cartridge, a spare area is used as before in the direction from the outer circumference to the inner circumference. On the other hand, if the optical disk is not covered with a cartridge, the spare area is used in the direction from the inner circumference to the outer circumference as a result of expecting that consecutive defects will increase.

Further, in an example of using this spare-area use direction flag in combination with other information, the size of the user area and the size of the spare area, which are included in DDS in DMA, are used. If the size of a spare area is larger than the fixed size, it can be understood that most defects consecutively occur in this application, and consequently the number of times alternate processing is performed is expected to be larger than usual. Therefore, the spare area is used in the direction from the inner circumference to the outer circumference. On the other hand, if the size of a spare area is smaller than the fixed size, a defect rarely occurs and most of the defects occur at random on a disk. Accordingly, it can be understood that the alternate processing is rarely performed. The spare area, therefore, is used in the direction from the outer circumference to the inner circumference.

Figure 12:
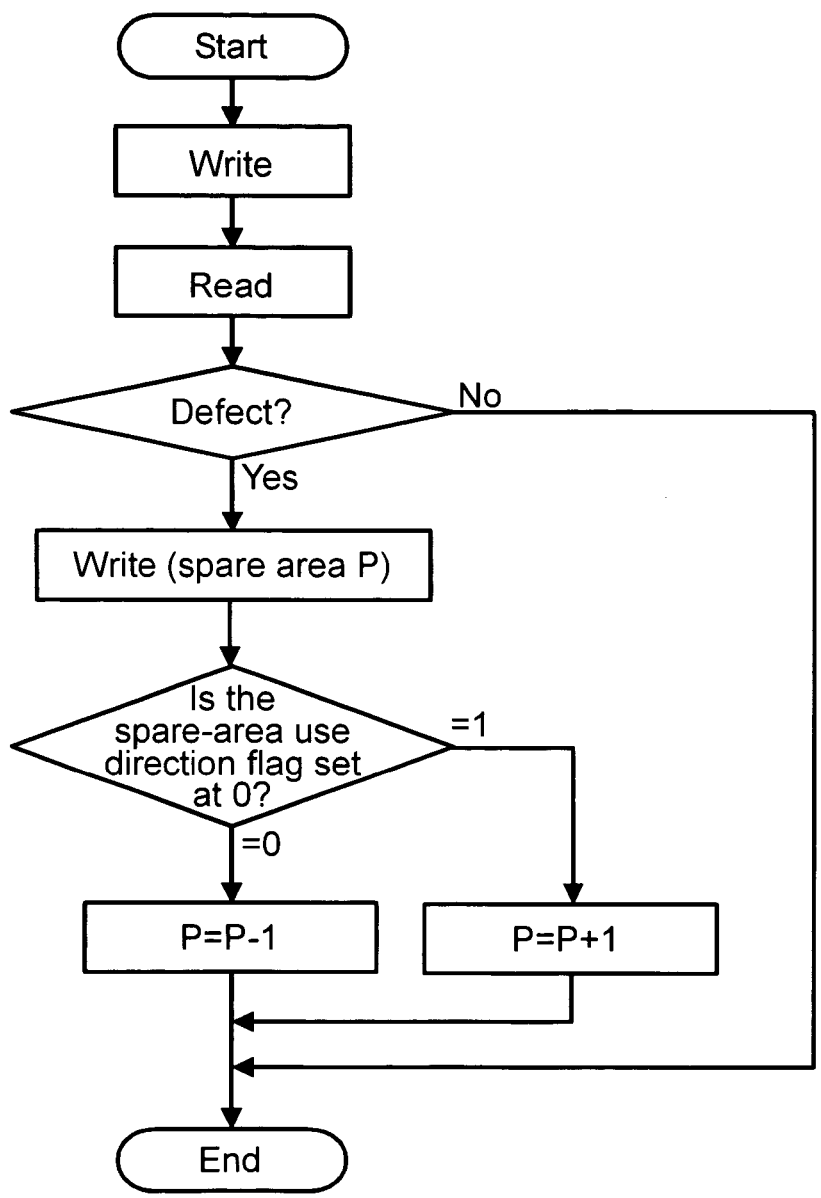
FIG. 12 is a flowchart illustrating alternate processing of an optical disk having a spare area, a use method of which can be switched.

FIG. 12 is a flowchart illustrating alternate processing of a read/write device, which is performed for an optical disk having a spare area in which methods of using the spare area can be switched by use of a flag. The read/write device first writes user data at a specified address on an optical disk according to a write command sent from a host, and then reads the written user data in order to verify whether or not this user data has been correctly written. If it is judged that the written user data is defective, alternate processing is performed; to be more specific, this user data is written at an address indicated by a pointer P. Then, according to a value of the spare-area use direction flag, a value of the pointer P is changed to P−1 or P+1.

What will be described next is an example in which DDS in DMA is provided with an address at which a spare area is divided, and management methods are switched on a divided area basis. However, it is also possible to use a technique by which this address is indirectly determined from various kinds of information including addresses and flags in the lead-in and lead-out areas, which are conventionally used.

Figure 7:
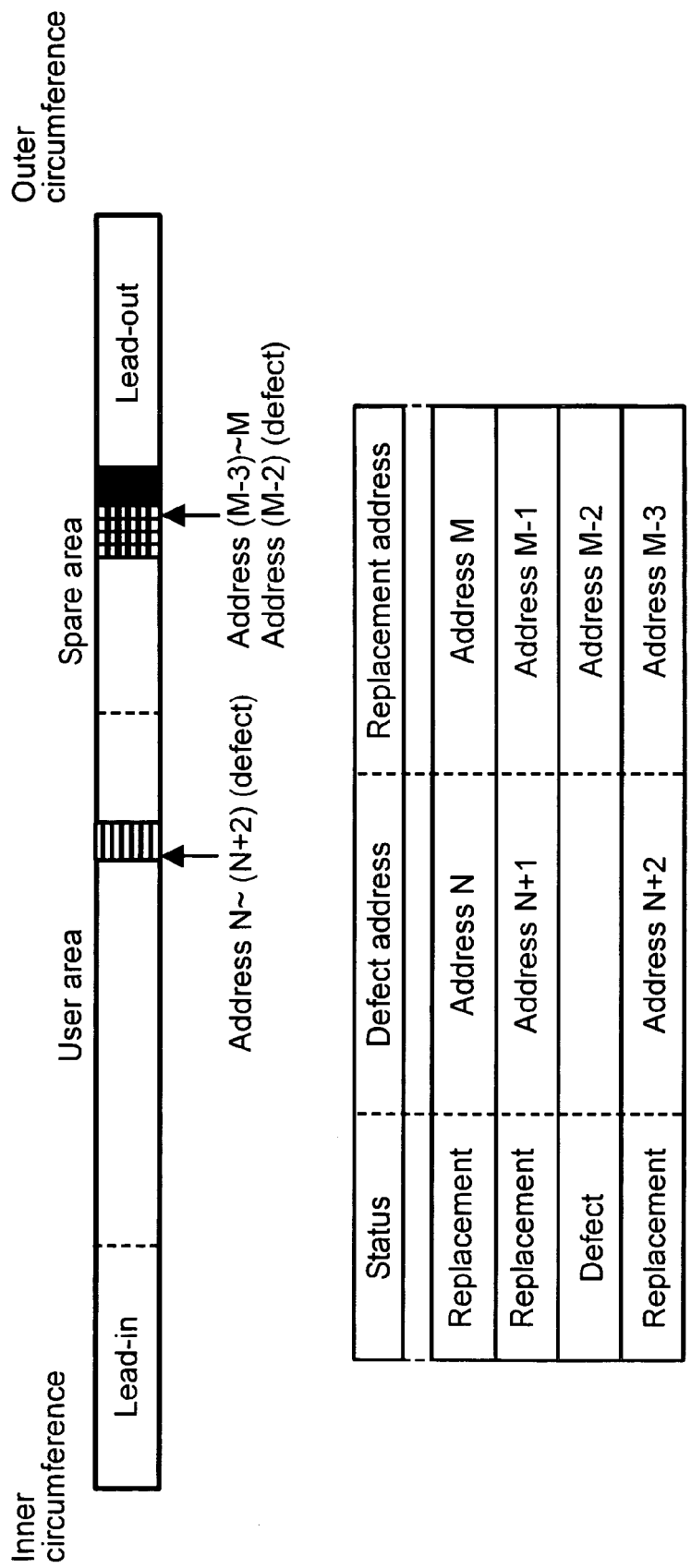
FIG. 7 is an explanatory diagram illustrating DL of consecutive defects.

FIG. 1 illustrates a method in which dividing a spare area according to a purpose of using an optical disk, and a physical shape, and properties, of the optical disk, and switching methods of using the spare area on a divided area basis, make it possible to make use of the advantages of both methods shown in FIGS. 7 and 8.

DDS in DMA included in the lead-in area is provided with address information at which a spare area is divided, and setting this address information at the time of formatting an optical disk makes it possible to use each area independently. Specifically, in FIG. 1, a spare area on the inner circumferential side of the disk is used in the direction from the outer circumference to the inner circumference, whereas a spare area on the outer circumferential side of the disk is used in the direction from the inner circumference to the outer circumference.

In this situation, each area requires one pointer P. Accordingly, a plurality of pointers P exist in the spare area at the same time. Therefore, when performing the alternate processing, it becomes possible to select a replacement address that can be replaced, which makes it possible to use each area according to each purpose.

For example, if the optical disk is used for video recording of an AV recorder, the rise time after inserting the disk should be faster than that of usual PC drives. In addition, a video file should also be continuously reproduced without intermission. Therefore, the alternate processing uses the spare area on the outer circumferential side, and is performed from the inner circumference of the disk to the outer circumference. However, if the same optical disk is used as a PC drive for data backup, the speed of writing/reading is not so important. Accordingly, the size of a spare area can be freely changed. The alternate processing, therefore, uses the spare area on the inner circumferential side, and the alternate processing is performed from the outer circumference of the disk to the inner circumference.

Moreover, a read/write device can also be so devised that independent of an application, the read/write device automatically uses a plurality of areas in a spare area in different manners. For example, if a defect occurs, instead of immediately starting the alternate processing, a judgment is made as to whether or not an address following a defect address is defective. After judging whether the defect has occurred singly or consecutively, the alternate processing is started.

Figure 13:
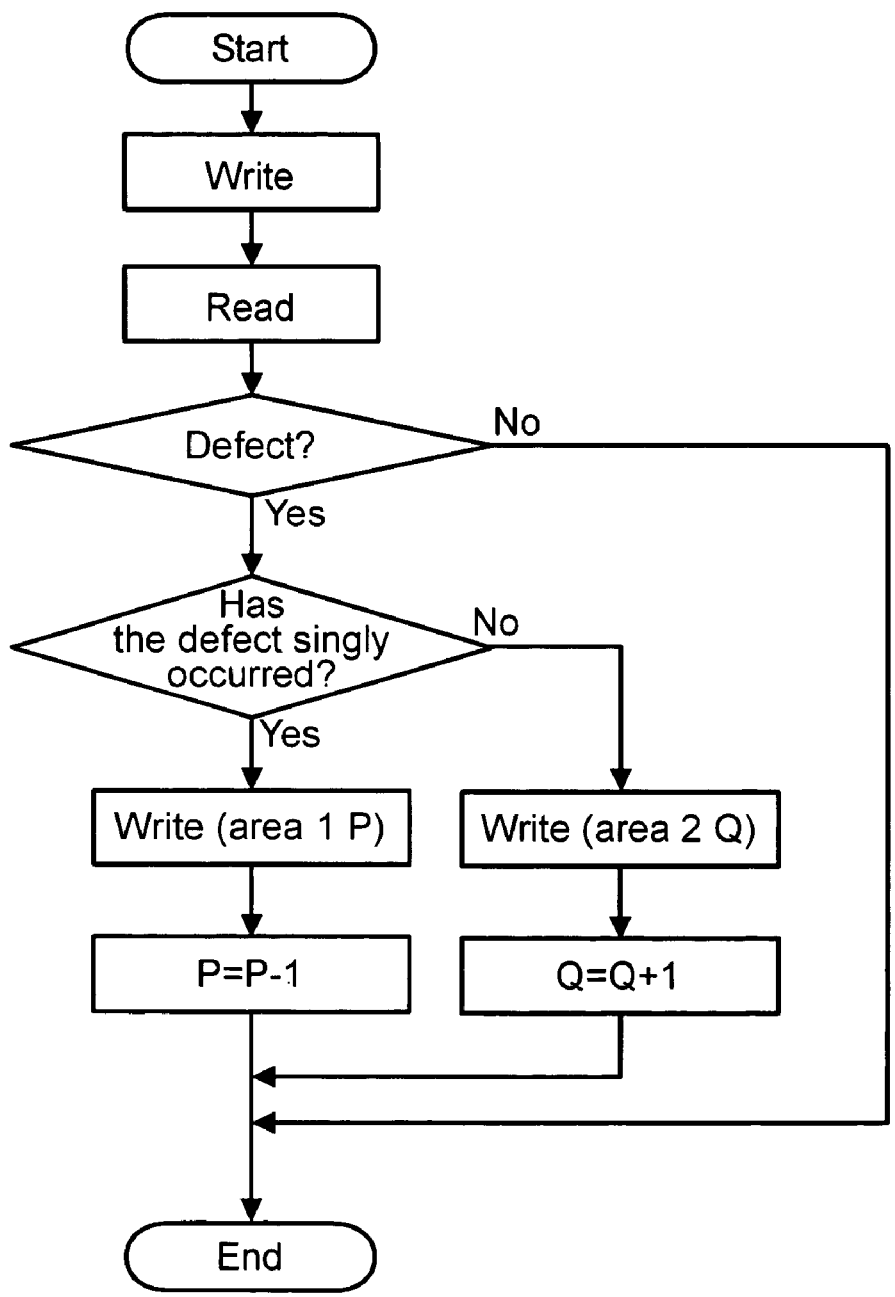
FIG. 13 is a flowchart illustrating alternate processing of an optical disk having a spare area that is logically divided into a plurality of areas.

FIG. 13 is a flowchart illustrating alternate processing of a read/write device, which is performed for an optical disk having a spare area that is divided according to a method of using the spare area.

The read/write device first writes user data at a specified address on an optical disk according to a write command sent from a host, and then reads the written user data in order to verify whether or not this user data has been correctly written. If it is judged that the written user data is defective, while keeping the user data stored in a memory in the read/write device, the user data is written at an address that follows the specified address, and the user data is then read in like manner. If the read user data is judged to be defective, it is judged that the alternate processing is continuously performed, and accordingly a recording area 2 is used. The recording area 2 is suitable for alternate processing that is continuously performed in the spare area. If it is judged that the address that follows the specified address is not defective, it is judged that the alternate processing is singly performed, and accordingly a recording area 1 which differs from the recording area 2 is used.

Up to this point, how to cope with defects consecutively occurring has been described. Such defects are expected to increase with the increase in density of a recording medium. The problem of such defects can be solved without losing the conventional advantages by switching the spare-area use direction according to intended uses.

A bit map is used as information that indicates whether or not a recording area has already been written. In this technique, the bit map can be used as a substitute for the above-mentioned pointer P indicating an address of an alternate area to be used next in a spare area. In other words, the bit map for the spare area is used to manage whether or not each address in a spare area of an optical disk has already been written. In this case, as is the case with the pointer P, the bit map for the spare area is managed in the lead-in area. After reading out this bit map from the lead-in area at the time of inserting a disk or at the time of power on, the read/write device stores the bit map in a RAM in the interface circuit 406. When processing of writing to a spare area is performed, the bit map is updated for a write address, and the latest bit map in the RAM is written to the optical disk at the appropriate times.

Figure 10:
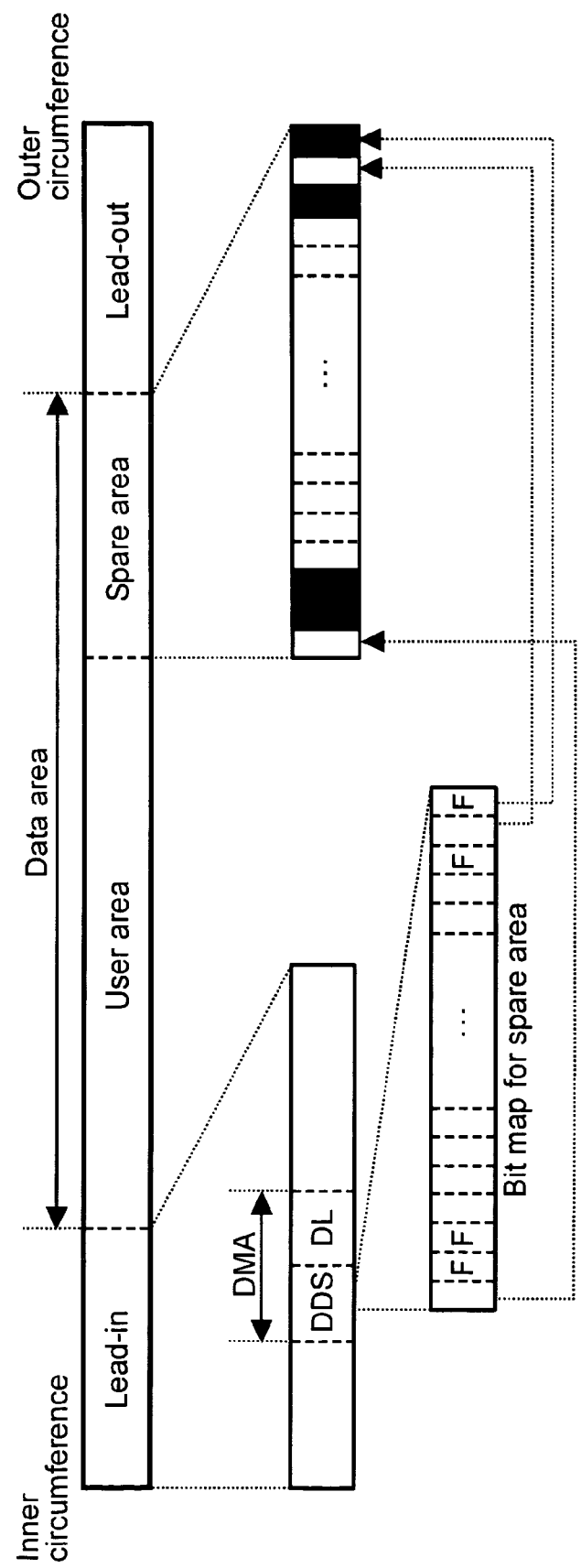
FIG. 10 is an explanatory diagram illustrating an optical disk having a spare area, a management method of which can be switched.

If a spare area is used in the direction that differs from the conventional spare-area use direction, or, unlike the conventional method, if it is not necessary to limit an address to be used next in a spare area, the bit map is made use of as shown in FIG. 10, instead of using the pointer P. Thus, because the bit map indicates information about whether or not each address in a spare area can be used as the next alternate area, the read/write device can quickly find an alternate area. Moreover, if the bit map is used, it becomes possible to use alternate areas in the spare area from several locations at the same time. Accordingly, if an address N of a user area is defective, an address M in the spare area is assigned as an alternate area. Subsequently, if an address N+2 is defective, instead of assigning an address M−1 or M+1 that is an adjacent address in the spare area, assigning an address M+2 as an alternate area with the address M+1 being kept unused allows the address M+1 existing between the alternate areas N and N+2 to be assigned when an address N+1 becomes defective in future. Incidentally, although FIG. 10 illustrates an example in which the bit map for managing the spare area is included in DDS of DMA and is managed there, it is not always necessary to manage this bit map in DDS.

Figure 11:
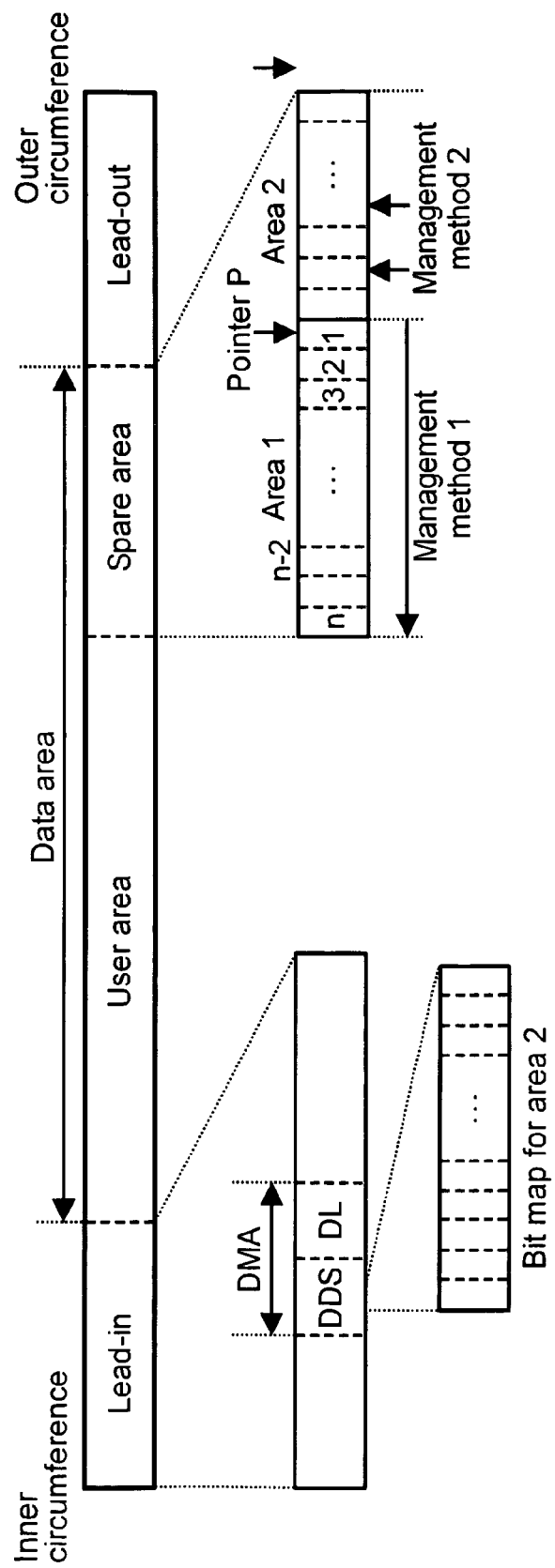
FIG. 11 is an explanatory diagram illustrating an optical disk having a spare area that is logically divided into a plurality of areas, each of which uses a different management method.

FIG. 11 is a diagram illustrating a method in which as is the case with FIG. 1, a spare area of an optical disk is divided into a plurality of areas, and using a bit map makes it possible to change how to use the spare area on a divided area basis.

In the example shown in FIG. 1, the plurality of logically divided areas in the spare area are used independently of one another. However, in the example shown in FIG. 11, the following method can be used: if the read/write device makes use of the spare area in the conventional manner, that is to say, in the direction from the outer circumference to the inner circumference, using one area, which is managed by the bit map, in the direction from the outer circumference to the inner circumference; and after the whole area managed by the bit map is used as alternate areas, using the other area in the direction from the outer circumference to the inner circumference. Moreover, as shown in FIG. 1, even if a spare area is used while selecting according to a purpose an alternate area in the direction from the middle of the spare area to the inner circumference, or an alternate area in the direction from the middle of the spare area to the outer circumference, the bit map can be used without causing a problem. Further, as is the case with FIG. 10, the following method for using a spare area can also be achieved: if an address N of an user area is defective, the read/write device assigns an address M in the spare area as an alternate area; subsequently, if an address N+2 is defective, instead of assigning an address M−1 or M+1 that is an adjacent address in the spare area, assigning an address M+2 as an alternate area with the address M+1 being kept unused allows the address M+1 existing between the alternate areas N and N+2 to be assigned when an address N+1 becomes defective in future.

Up to this point, how to cope with defects consecutively occurring has been described. Such defects are expected to increase with the increase in density of a recording medium. The problem of such defects can be solved without losing the conventional advantages by switching the spare-area management method according to intended uses.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A data recording method for recording data on a recording medium including a lead-in area, a user area, a spare area having an alternate area of the user area, and a lead-out area, said method comprising the steps of:
    receiving from a higher-level device a write command to write data at a first address in the user area;
    writing the data in the user area at the first address;
    reading the written data to thereby judge whether or not the user area at the first address is defective;
    if it is judged that the user area at the first address is defective, determining a second address in the spare area by use of a flag value that has been written to the lead-in area or the lead-out area at the time of initialization, wherein said flag value comprises a value indicating a direction in which the spare area is used; and
    writing in the spare area at the second address the data received from the higher-level device.

2. The data recording method according to claim 1, wherein said flag value indicates management information of the user area.

3. The data recording method according to claim 1, wherein said flag value indicates the area size of the spare area.

4. A data recording method for recording data on a write once read many recording medium including a lead-in area, a user area, a spare area having an alternate area of the user area, and a lead-out area, said method comprising the steps of:
    receiving from a higher-level device a write command to write data at a first address in the user area;
    judging, from management information of the lead-in area, whether or not writing has already been performed in the user area at the first address;
    if it is judged that writing has already been performed in the user area at the first address, determining a second address in the spare area by use of a flag value that has been written to the lead-in area or the lead-out area at the time of initialization; and
    writing in the spare area at the second address the data received from the higher-level device.

5. The data recording method according to claim 4, wherein said flag value comprises a value indicating a direction in which the spare area is used.

6. The data recording method according to claim 5, wherein said flag value indicates management information of the user area.

7. The data recording method according to claim 5, wherein said flag value indicates the area size of the spare area.

8. A data recording method for recording data on a recording medium including a lead-in area, a user area, a spare area having an alternate area of the user area, and a lead-out area, said method comprising the steps of:
    receiving from a higher-level device a write command to write data at a first address in the user area;
    writing the data in the user area at the first address;
    reading the written data to thereby judge whether or not the user area at the first address is defective;
    if it is judged that the user area at the first address is defective, determining a second address in the spare area by use of spare-area management information selected by a flag value that has been written to the lead-in area or the lead-out area at the time of initialization; and
    writing in the spare area at the second address the data received from the higher-level device.

9. The data recording method according to claim 8, wherein said spare-area management information comprises an address pointer and a bit map.

10. A data recording method for recording data on a write once read many recording medium including a lead-in area, a user area, a spare area having an alternate area of the user area, and a lead-out area, said method comprising the steps of:
    receiving from a higher-level device a write command to write data at a first address in the user area;
    judging, from management information of the lead-in area, whether or not writing has already been performed in the user area at the first address;
    if it is judged that writing has already been performed in the user area at the first address, determining a second address in the spare area by use of spare-area management information selected by a flag value that has been written to the lead-in area or the lead-out area at the time of initialization; and
    writing in the spare area at the second address the data received from the higher-level device.

11. The data recording method according to claim 10, wherein said spare-area management information comprises an address pointer and a bit map.

12. A data recording device for recording data on a recording medium including a lead-in area, a user area, a spare area having an alternate area of the user area, and a lead-out area, said device performing the steps of:
    receiving from a higher-level device a write command to write data at a first address in the user area;
    writing the data in the user area at the first address;
    reading the written data to thereby judge whether or not the user area at the first address is defective;
    if it is judged that the user area at the first address is defective, determining a second address in the spare area by use of a flag value that has been written to the lead-in area or the lead-out area at the time of initialization; and
    writing in the spare area at the second address the data received from the higher-level device.

13. The data recording device according to claim 12, wherein said flag value comprises a value indicating a direction in which the spare area is used.

14. A data recording device for recording data on a write once read many recording medium including a lead-in area, a user area, a spare area having an alternate area of the user area, and a lead-out area, said device performing the steps of:
    receiving from a higher-level device a write command to write data at a first address in the user area;
    judging, from management information of the lead-in area, whether or not writing has already been performed in the user area at the first address;
    if it is judged that writing has already been performed in the user area at the first address, determining a second address in the spare area by use of a flag value that has been written to the lead-in area or the lead-out area at the time of initialization; and
    writing in the spare area at the second address the data received from the higher-level device.

15. The data recording device according to claim 14, wherein said flag value comprises a value indicating a direction in which the spare area is used.

16. A data recording method for recording data on a recording medium including a user area and a spare area having an alternate area of the user area, said method comprising the steps of:
    receiving from a higher-level device a write command to write data at a first address in the user area;
    writing the data in the user area at the first address;

reading the written data to determine whether or not the user area at the first address is defective;

upon determining that the user area at the first address is defective, determining a second address in the spare area;

if a first condition is met, writing the data received from the higher-level device in the spare area at the second address in a first direction; and if a second condition is met, writing the data received from the higher-level device in the spare area at the second address in a second direction opposite the first direction.

17. The data recording method according to claim 16, wherein the first and second conditions are indicated by a flag value that has been written to a lead-in area or a lead-out area, at a time of initialization of the recording medium.

18. The data recording method according to claim 16, wherein:
the first condition comprises detection of consecutively occurring defects on the user area of the recording medium; and
the second condition comprises detection of a singularly occurring defect at the first address.

19. The data recording method according to claim 16, wherein the first and second conditions relate to first and second types of applications for the recording of data on the recording medium.

20. A data recording device for recording data on a recording medium including a user area and a spare area having an alternate area of the user area, a processor of the data recording device configures the data recording device to perform the steps of:
receiving from a higher-level device a write command to write data at a first address in the user area;
writing the data in the user area at the first address;
reading the written data to determine whether or not the user area at the first address is defective;
upon determining that the user area at the first address is defective, determining a second address in the spare area;
if a first condition is met, writing the data received from the higher-level device in the spare area at the second address in a first direction; and
if a second condition is met, writing the data received from the higher-level device in the spare area at the second address in a second direction opposite the first direction.

21. A data recording method for recording data on a recording medium including a user area and a spare area having an alternate area of the user area, said method comprising the steps of:
receiving from a higher-level device a write command to write data at a first address in the user area;
writing the data in the user area at the first address;
reading the written data to determine whether or not the user area at the first address is defective;
upon determining that the user area at the first address is defective, determining whether a defect has singularly occurred in the user area at the first address or defects are occurring consecutively on the user area of the recording medium;
determining a second address in the spare area;
if the defect has singularly occurred in the user area at the first address, writing the data received from the higher-level device at the second address in accord with a first procedure; and
if defects have occurred consecutively on the user area of the recording medium, writing the data received from the higher-level device at the second address in accord with a second procedure different from the first procedure.

22. The data recording method according to claim 21, wherein the first procedure comprises writing the data received from the higher-level device in a first spare area, and the second procedure comprises writing the data received from the higher-level device in a second spare area different from the first spare area.

23. The data recording method according to claim 21, wherein the first procedure comprises writing the data received from the higher-level device in a first direction on the recording medium, and the second procedure comprises writing the data received from the higher-level device in a second direction on the recording medium different from the first direction on the recording medium.

24. A data recording device for recording data on a recording medium including a user area and a spare area having an alternate area of the user area, a processor of the data recording device configures the data recording device to perform the steps of:
receiving from a higher-level device a write command to write data at a first address in the user area;
writing the data in the user area at the first address;
reading the written data to determine whether or not the user area at the first address is defective;
upon determining that the user area at the first address is defective, determining whether a defect has singularly occurred in the user area at the first address or defects are occurring consecutively on the user area of the recording medium;
determining a second address in the spare area;
if the defect has singularly occurred in the user area at the first address, writing the data received from the higher-level device at the second address in accord with a first procedure; and
if defects have occurred consecutively on the user area of the recording medium, writing the data received from the higher-level device at the second address in accord with a second procedure different from the first procedure.

* * * * *